No. 832,007. PATENTED SEPT. 25, 1906.
A. J. BAXTER.
BRAKE ATTACHMENT FOR HAY RACKS.
APPLICATION FILED SEPT. 27, 1905.
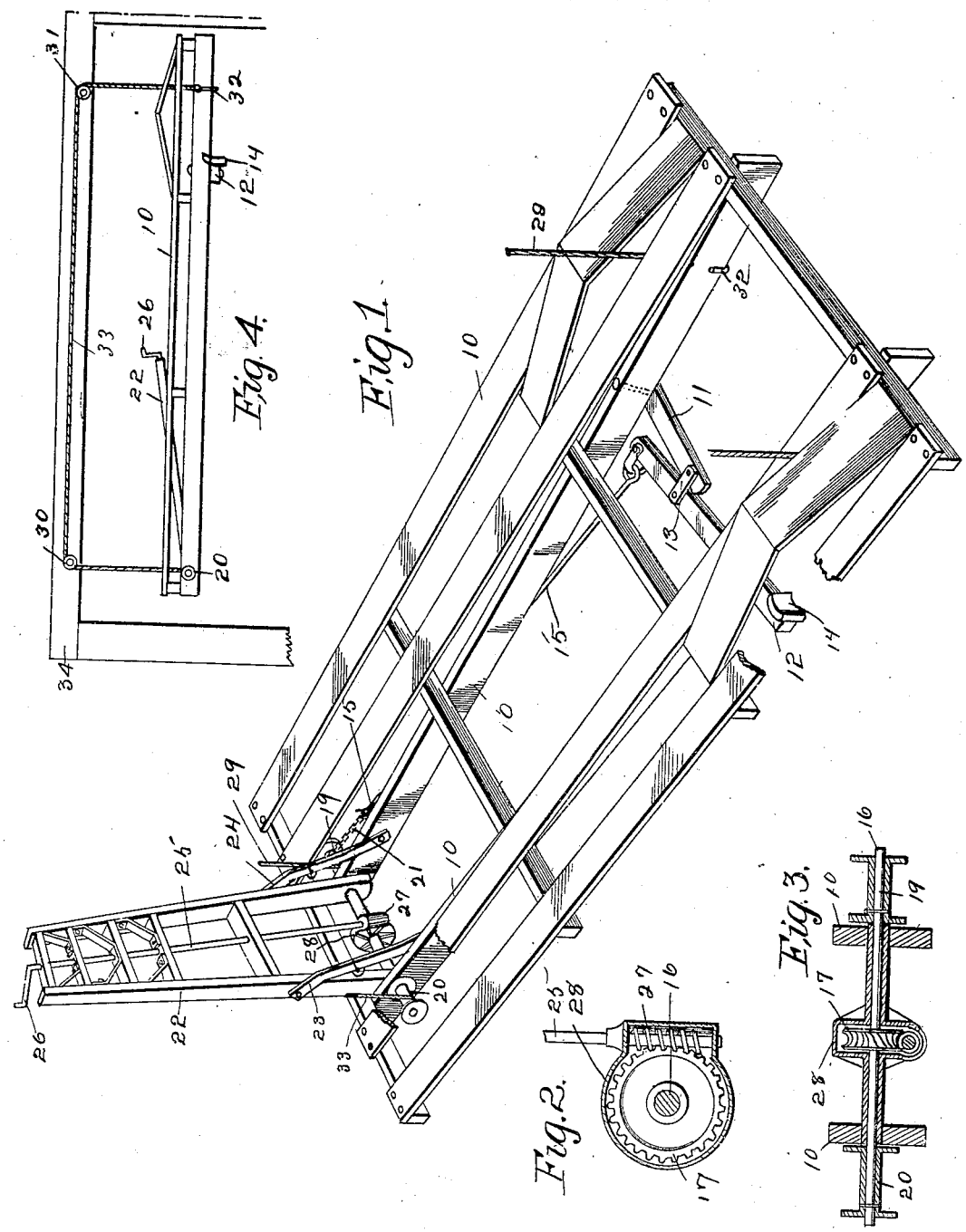
Witnesses
A. G. Hague
S. F. Christy.
Inventor A. J. Baxter,
by Orwig & Lane attys

UNITED STATES PATENT OFFICE.

ALVAH J. BAXTER, OF ALEDO, ILLINOIS.

BRAKE ATTACHMENT FOR HAY-RACKS.

No. 832,007.  Specification of Letters Patent.  Patented Sept. 25, 1906.

Application filed September 27, 1905. Serial No. 280,349.

*To all whom it may concern:*

Be it known that I, ALVAH J. BAXTER, a citizen of the United States, residing at Aledo, in the county of Mercer and State of Illinois, have invented a certain new and useful Attachment for Hay-Racks, of which the following is a specification.

The objects of my invention are to provide a wagon-brake designed to be attached to hay and similar racks which can be manipulated either from the top of the load of hay or from the body of the rack at the pleasure of the operator.

A further object is to provide a mechanism which is not only used as a brake for racks, but a portion of which can be used in elevating the rack from the body of the wagon, so that the wagon can be withdrawn from beneath the rack.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 is a perspective view of a rack, showing my brake and elevating device attached to it. Fig. 2 is a detail side elevation of the worm-gear used in my mechanism and in section the casing which covers it. Fig. 3 is a cross-sectional view of the pulleys, showing the way in which they are mounted on the shaft which is operated by my worm-gear. Fig. 4 is a detail view of the wagon-rack elevated from the truck and supported by my device.

Referring to the accompanying drawings, I have used the reference-numeral 10 to indicate the rack, which has the levers 11 and 12 pivoted to its rear end and having said levers pivoted together by means of the link 13. Each of the levers 11 and 12 has a curved brake-shoe 14 at its free end, which is designed to engage the wheels of the wagon on which the rack is to be mounted. Pivotally connected with the free end of the lever 12 is a rod 15. Mounted at the forward end of the rack and extending across it is a shaft 16, having mounted on its central portion a gear 17. Mounted on one end of the shaft 16 is a spool 19. Mounted on the other end of the shaft from the spool 19 is a spool 20. Secured to the spool 19 is a chain 21, which chain is secured at its other end to the free end of the rod 15. Pivotally mounted on the shaft 16 is a frame 22, which is maintained at its upper limit of movement relative to the rack by means of the hinged braces 23 and 24, each of which braces is secured at one end to the frame and at the other end to the rack and are so arranged that as the frame is swung downwardly on the shaft 16 toward the body of the rack and the hinge drawn past the dead-center, which locks them in position, they will permit the frame to rest against the top of the rack, as shown in Fig. 4 of the drawings. Extending vertically of the frame 22 is a crank-shaft 25, having the crank 26 at its upper end. At the lower end of said shaft 25 I have provided a worm-gear 27 in mesh with the gear 17, which is provided so that as the crank is turned the gear 17, and consequently the shaft on which it is mounted, will be normally maintained in any desired position and against rotary movement in either direction except by the rotation of the crank 26 and through the shaft 25. As the crank 26 is turned in one direction the shoes 14 will be thrown into engagement with the rear wheel of the wagon on which the rack is mounted, and as the crank is turned in the opposite direction these brake-shoes will be thrown out of engagement with the rear wagon-wheels.

I have provided a casing 28 for incasing the worm-gear 27 and the gear 17, so as to prevent hay or any foreign substances from getting into the worm-gearing and impeding its operation. It will be readily seen that when the frame 22 is in an upright position the brake can be operated from the top of a load of hay, and when the frame 22 is in position in engagement with the rack, as shown in Fig. 4, the crank 26 can be turned from the rack and the brake operated.

Secured to the pulley 19 is a rope 29, which has a hook 32 at its free end and which is designed to pass over pulleys 30 and 31 and have its hook 32 secured to the rear end of the rack, as shown in Fig. 4. I have also provided a rope 33, which is secured at one end to the pulley 20 and has a hook 32, which is designed to pass over two pulleys similar to the pulleys 30 and 31 and to be hooked to the rear end of the rack, so that as the rod 15 is disconnected from the chain 21 and the crank 26 operated the shaft 16 will be rotated and will correspondingly rotate the spools 19 and 20 and will cause the ropes 29 and 33 to be wound upon these spools, and consequently raise the rack from the wagon when these ropes pass over the pulleys 30 and 31 and pulleys similar thereto, all of which are supported by the beam 34. By this construction the rack can be maintained in any desirable position relative to the beam 34 and can be easily lowered onto the wagon-body at the pleasure of the operator by means of the crank 26.

In practical use the advantage of combining a mechanism for braking the wagon and one which will perform the function of raising the rack from the wagon and support it in a shed or barn, where it can be easily replaced on the wagon-body, is clearly obvious, and a further pointing out of these advantages is deemed unnecessary.

Having thus described my invention, what I claim, and desire to secure by Letters Patent of the United States therefor, is—

In a device of the class described, a pivotally-mounted lever, a brake-shoe secured to one end thereof, a rotatable shaft, a worm-gear for rotating said shaft, means for connecting the shaft with the pivotally-mounted lever, a frame pivotally secured to the shaft, a crank-shaft mounted in said frame and connected with said worm-gear, a crank at the upper end of the crank-shaft, spools at the ends of the shaft, ropes connected with said spools, and a hook at the free end of said ropes, for the purposes stated.

ALVAH J. BAXTER.

Witnesses:
　Gus S. Brown,
　Harland Cady.